(12) United States Patent  
Hayward et al.

(10) Patent No.: US 11,289,988 B2  
(45) Date of Patent: Mar. 29, 2022

(54) VIBROTACTILE ACTUATOR

(71) Applicant: ACTRONIKA SAS, Paris (FR)

(72) Inventors: Vincent Hayward, Paris (FR); Pierre Comot, Paris (FR); Rafal Pijewski, Paris (FR)

(73) Assignee: ACTRONIKA SAS, Paris (FR)

( * ) Notice: Subject to any disclaimer, the term of this patent is extended or adjusted under 35 U.S.C. 154(b) by 106 days.

(21) Appl. No.: 16/628,885

(22) PCT Filed: Jul. 4, 2018

(86) PCT No.: PCT/EP2018/068069  
§ 371 (c)(1),  
(2) Date: Jan. 6, 2020

(87) PCT Pub. No.: WO2019/008021  
PCT Pub. Date: Jan. 10, 2019

(65) Prior Publication Data  
US 2020/0235649 A1 Jul. 23, 2020

(30) Foreign Application Priority Data  
Jul. 7, 2017 (FR) ...................... 1756450

(51) Int. Cl.  
*G08B 6/00* (2006.01)  
*H02K 33/16* (2006.01)

(52) U.S. Cl.  
CPC ............... *H02K 33/16* (2013.01); *G08B 6/00* (2013.01)

(58) Field of Classification Search  
CPC .......... H02K 33/16; H02K 33/04; G08B 6/00; G06F 3/016; H04M 19/047  
See application file for complete search history.

(56) References Cited

U.S. PATENT DOCUMENTS

| | | |
|---|---|---|
| 6,307,287 B1 | 10/2001 | Garrett et al. |
| 2012/0104875 A1 | 5/2012 | Park |
| (Continued) | | |

FOREIGN PATENT DOCUMENTS

| | | |
|---|---|---|
| CN | 102158039 A | 8/2011 |
| CN | 205160331 U | 4/2016 |
| (Continued) | | |

OTHER PUBLICATIONS

International Search Report as issued in International Patent Application No. PCT/EP2018/068069, dated Oct. 1, 2018.

(Continued)

*Primary Examiner* — Toan N Pham  
(74) *Attorney, Agent, or Firm* — Pillsbury Winthrop Shaw Pittman LLP

(57) ABSTRACT

A vibrotactile actuator includes a network of flat electromagnetic coils positioned contiguously in a plane, the network of coils being able to generate a Laplace force under the effect of an electric current passing through the network of coils, a network of permanent magnets assembled linearly in a plane parallel to the plane of the network of coils and forming a Halbach network generating magnetic field lines oriented towards the network of coils, an electromagnetic interaction between the current lines passing through the network of coils and the magnetic field lines giving rise, as a result of the Laplace force, to relative translational movement between the network of coils and the network of magnets, and an elastic guide device for generating haptic vibrations from the relative translational movements of the network of coils and the network of magnets.

27 Claims, 5 Drawing Sheets

(56) References Cited

U.S. PATENT DOCUMENTS

| | | |
|---|---|---|
| 2012/0112565 A1 | 5/2012 | Lee |
| 2014/0346901 A1 | 11/2014 | Hayward et al. |
| 2016/0226359 A1* | 8/2016 | Guo ................ H02K 33/16 |
| 2016/0226365 A1 | 8/2016 | Wang et al. |

FOREIGN PATENT DOCUMENTS

| | | |
|---|---|---|
| CN | 105680663 A | 6/2016 |
| JP | H09-117721 A | 5/1997 |
| JP | 2004-202327 A | 7/2004 |
| JP | 2010-082501 A | 4/2010 |
| JP | 2011-019384 A | 1/2011 |
| JP | 2016-182605 A | 10/2016 |
| JP | 3208869 U | 2/2017 |
| JP | 2017-074573 A | 4/2017 |
| JP | 2017-093227 A | 5/2017 |
| KR | 10-2010-0108963 A | 10/2010 |
| WO | WO 2016/167299 A1 | 10/2016 |

OTHER PUBLICATIONS

Notice of Reasons for Refusal as issued in Japanese Patent Application No. 2020-522782, dated Dec. 21, 2021.

\* cited by examiner

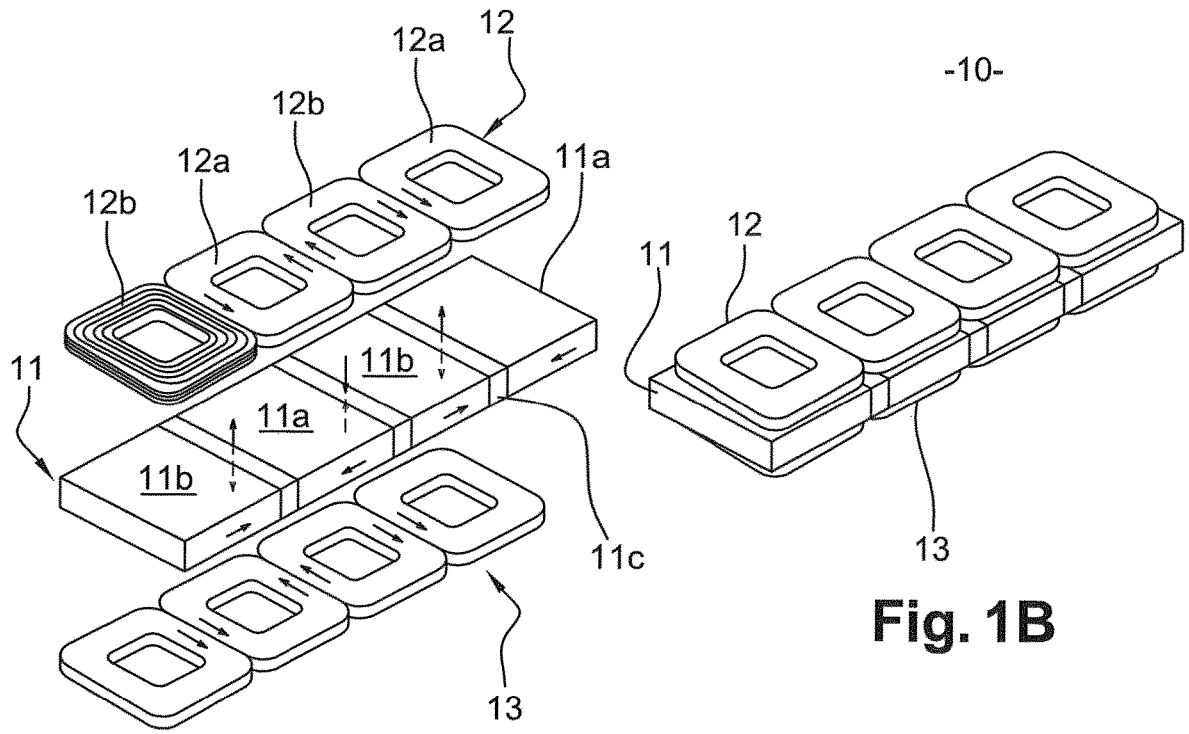
Fig. 1A
Fig. 1B
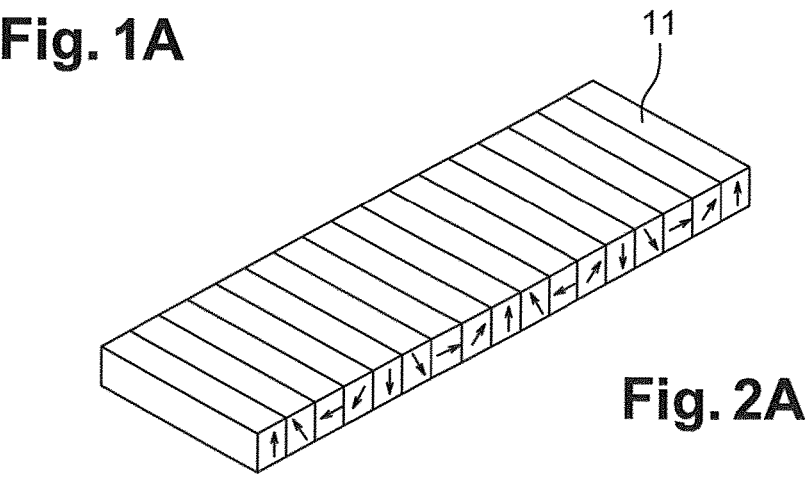
Fig. 2A
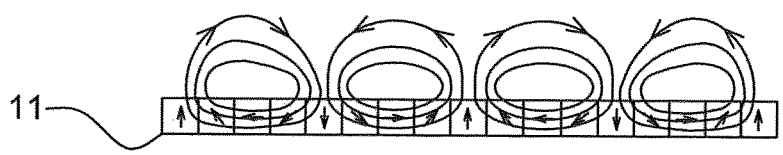
Fig. 2B

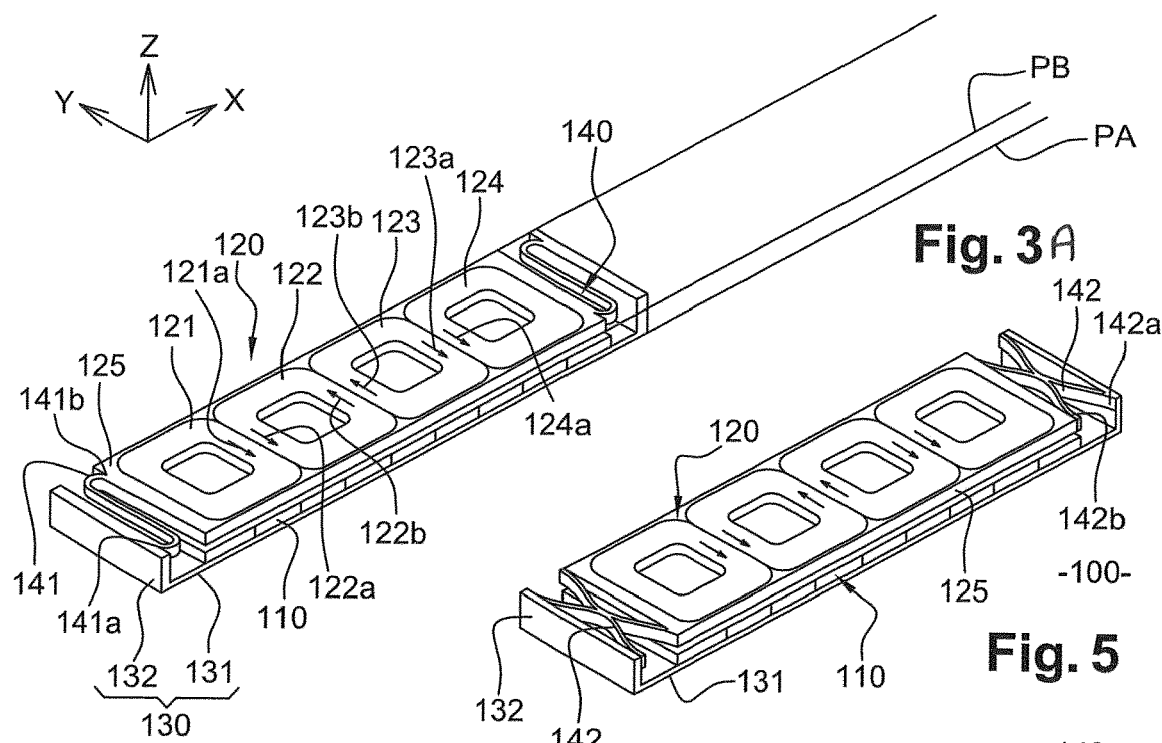
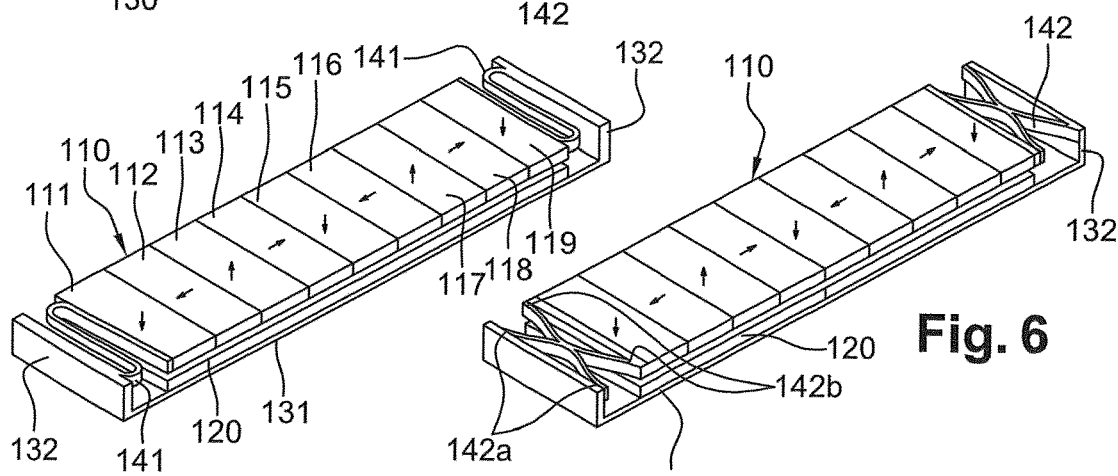
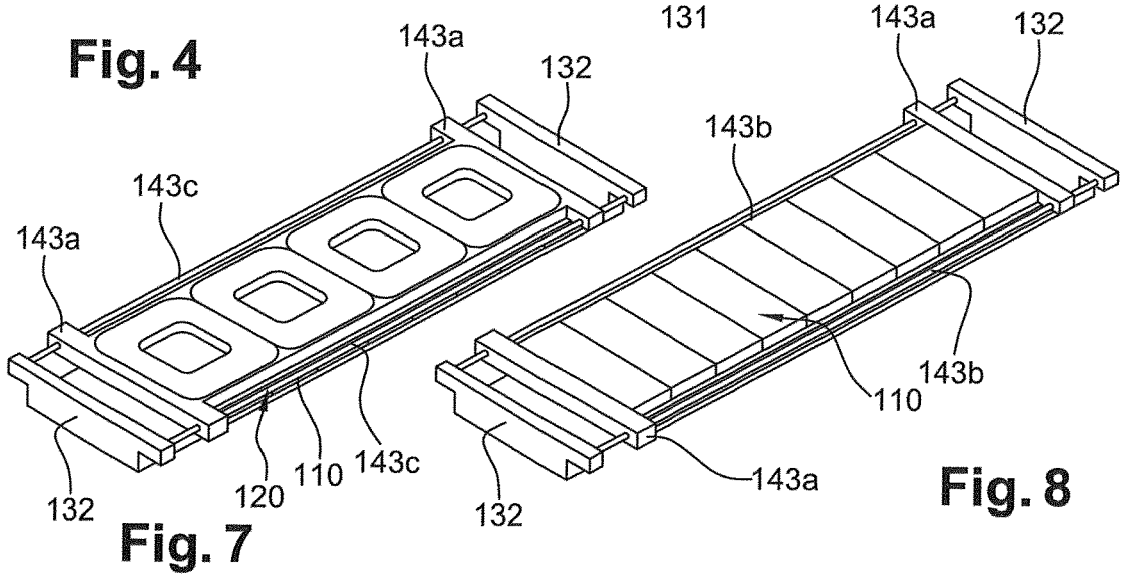

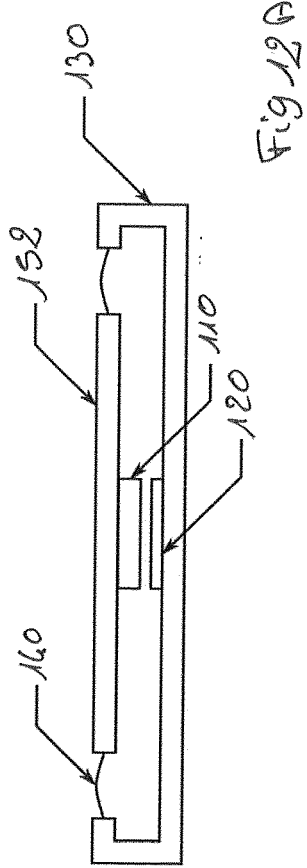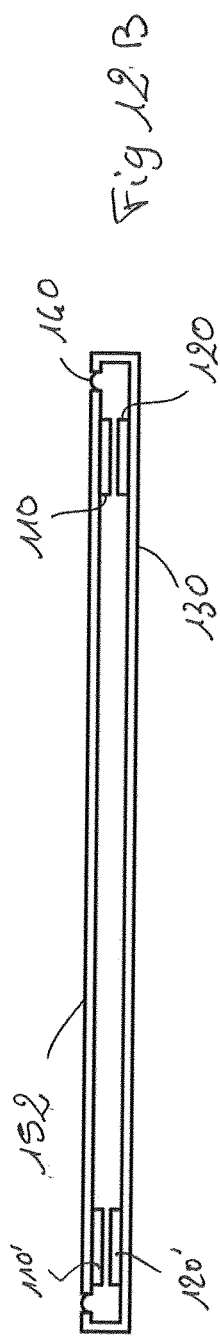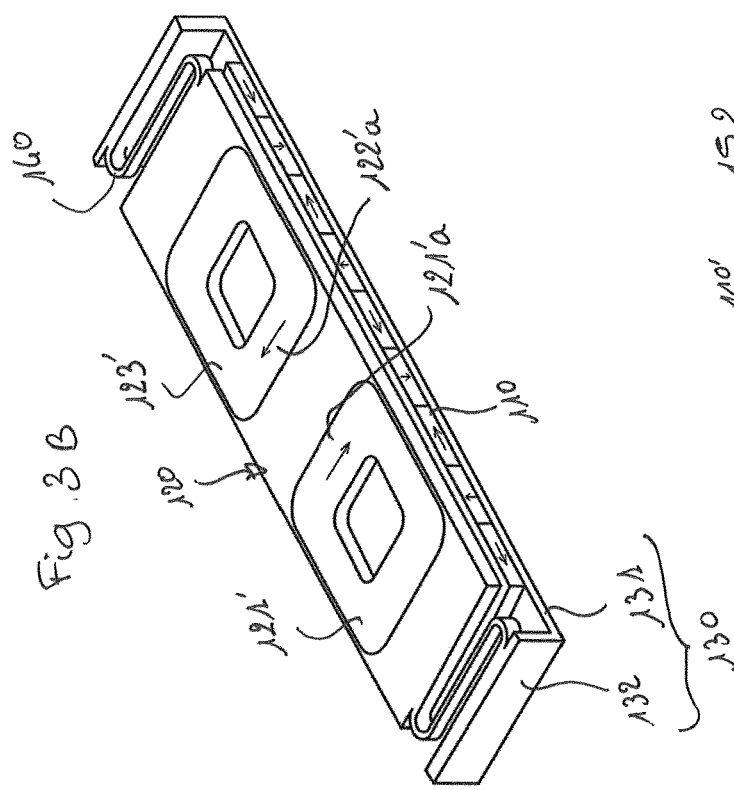

VIBROTACTILE ACTUATOR

CROSS-REFERENCE TO RELATED APPLICATIONS

This application is the U.S. National Stage of PCT/EP2018/068069, filed Jul. 4, 2018, which in turn claims priority to French patent application number 1756450 filed Jul. 7, 2017. The content of these applications are incorporated herein by reference in their entireties.

TECHNICAL FIELD

The present invention concerns a vibrotactile actuator enabling vibrations to be generated from motions caused by a Halbach array interacting with an electric current.

The invention finds applications in the field of haptic interfaces intended to reproduce the tactile sensations using vibrotactile stimuli and, generally, in all fields in which vibrations cause sensations, such as, for example, in the field of simulators or in the field of augmented reality.

STATE OF THE PRIOR ART

Today it is known to use vibrotactile actuators to communicate data by tactile means to a human being. These vibrotactile actuators transform an electrical signal, generated by a machine (for example a mobile telephone or a computer) into a vibratory signal which is perceivable by the sense of touch.

The mobile telephone is a well known example of a device equipped with a vibrotactile actuator. In this example the vibrotactile actuator generally comprises an eccentric mass which is made to rotate by an electric motor, and by its movements this mass generates vibrations due to the principle of conservation of angular momentum, which inform the user of a piece of information, for example of the receipt of a telephone communication or a message.

Another example of a known vibrotactile actuator is that used in certain touchpads, enabling a pointer on a screen to be directed by sliding a finger. Generally, in touchpads the movement of the pointer is obtained by varying a weak electric current relating to the proximity of the fingers, which by nature possess easily detectable dielectric properties. This electrical variation also enables, by brief oscillations, the "click" of a mechanical button, such as the button of a mouse, to be simulated. Such touchpads have been described, notably by MacKenzie, I. Scott, and Aleks Oniszczak in the article: "The tactile touchpad", In CHI'97 Extended Abstracts on Human Factors in Computing Systems, pp. 309-310, ACM, 1997.

However, these vibrotactile actuators are not only relatively thick, but they are also generally mono-frequential. They therefore enable vibrations to be generated of a vibratory amplitude which is irremediably related to the speed of rotation and therefore to the frequency of oscillation, procuring a unique feeling for the user. Another family of vibrotactile actuators is based on the phenomenon of resonance of a mass-spring system, and therefore has the same disadvantage. In other words, the user feels vibrations, but all the vibrations are perceived identically. These known vibrotactile actuators are therefore not exploitable in haptic applications in which it is sought to reproduce the rich sensations of the sense of touch.

In addition, it is known, in mechanics, to use electrodynamic linear motors to generate translational motions. Of these linear motors, the one described in document US2014/0346901 provides a configuration which is relatively thin. Such a linear motor 10 comprises, as represented in FIGS. 1A and 1B, a network of magnets 11 comprising a plurality of aligned magnets 11a, 11b with alternating polarities. This configuration of network of magnets 11 enables a concentration of field lines, generated by the said network, which are roughly orthogonal to the plane of network of magnets 11. This linear motor 10 also comprises a first and a second assemblies 12, 13 of electromagnetic coils, both flat and rectangular. Coil assemblies 12, 13 are each positioned in a plane parallel to the plane of network of magnets 11, either side of said network of magnets 11. In this manner, under the effect of an electric current traversing them, coil assemblies 12, 13 create a horizontal Laplace force, between each plane of the coil assemblies and the plane of the network of magnets. The effect of this Laplace force is to move coil assemblies 12, 13 relative to network of magnets 11 and, vice versa, to move the network of magnets relative to the coil assemblies, so as to cause a translational motion. One of the best-known applications of such a linear motor is the magnetic levitation train, in which the successive relative movements between the coil assemblies and the network of magnets causes the train to move along a rail.

In linear motors certain configurations of magnets have the characteristic that they guide the field lines only on one side of the plane of the network of magnets. This configuration of magnets, called a Halbach array, consists in positioning the magnets such that the symmetry of the geometry of the paths of the field lines is disrupted, as represented in FIGS. 2A and 2B. To accomplish this the magnets are arranged such that the polarisation of contiguous magnets differs. For example, the polarisation of two contiguous magnets can be aligned in orthogonal directions or at angles of less than 90°, as in the example of FIGS. 2A-2B, in which the angles of difference of the polarisation directions are of the order of 45°. The smaller the angle between the polarisations, the less the dispersion of the field lines, allowing, for an equal current, a larger relative translational motion.

SUMMARY OF THE INVENTION

To respond to the problem mentioned above of the thickness and the single level of vibration of known vibrotactile actuators, the applicant proposes a vibrotactile actuator comprising a linear motor with a Halbach array in which the translation motions caused by the linear motor are transformed into haptic vibrations by sliding or elastic guidance means.

According to a first aspect, the invention concerns a vibrotactile actuator, comprising:
- a network of flat electromagnetic coils positioned contiguously in a plane and arranged such that an electric current flows, in adjacent segments of two juxtaposed coils, in common directions which alternate from one pair to the next, where the said network of coils is able to generate a Laplace force, under the effect of an electric current traversing the network of coils,
- a network of permanent magnets assembled in linear fashion in a plane parallel to the plane of the network of coils, the polarities of which are aligned in different directions, where the said network of magnets forms a Halbach array generating magnetic field lines aligned towards the network of coils, where an electromagnetic interaction between current lines traverses the network of coils, and the magnetic field lines cause, by the Laplace force, relative translation motions between the network of coils and the network of magnets, and elastic guidance means to generate haptic vibrations from relative translation motions between the network of coils and the network of magnets.

This vibrotactile actuator has the advantage that it has a wide bandwidth, enabling it to generate a large range of the amplitudes and frequencies of the vibrations able reproduce the sensations of the sense of touch in human beings. This actuator also has the advantage that it is thin, meaning that it can be introduced into all kinds of devices.

According to a second aspect, the invention concerns a vibrotactile actuator, comprising:

a network of flat electromagnetic coils positioned non-contiguously in a plane and arranged such that an electric current flows in identical directions in each coil, where the said network of coils is able to generate a Laplace force, under the effect of the electric current traversing the said network of coils, a network of permanent magnets assembled in linear fashion in a plane parallel to the plane of the network of coils, the polarities of which are aligned in different directions, where the said network of magnets forms a Halbach array generating magnetic field lines aligned towards the network of coils (120), where an electromagnetic interaction between current lines traverses the network of coils, and the magnetic field lines cause, by the Laplace force, relative translation motions between the network of coils and the network of magnets, and elastic guidance means to generate haptic vibrations from relative translation motions between the network of coils and the network of magnets Advantageously, the vibrotactile actuator according to one or other aspect of the invention can have one or more of the following characteristics:

The vibrotactile actuator comprises a frame in which the network of coils and the network of magnets are installed.

The elastic guidance means are installed at least partially between the frame and either the network of coils or the network of magnets.

The elastic guidance means are installed longitudinally in the plane of the network of coils.

The elastic guidance means are installed longitudinally in the plane of the network of magnets.

The elastic guidance means comprise at least two guidance and return elements, each installed at one end of the network of coils or of the network of magnets.

The guidance and return elements are made of an elastic material the material and geometry of which lead to a bandwidth of between approximately 10 Hz and 10 kHz.

Each guidance and return element comprises a thin S-shaped blade.

Each guidance and return element comprises a thin X-shaped blade.

Each guidance and return element comprises thin blades shaped like oblong loops installed laterally either side of the network of coils or the network of magnets.

The guidance and return elements comprise, optionally, impeding means able to constrain the relative translation motions in the direction normal to the network of magnets and to the network of coils.

The fine blade is electrically conductive and powers the network of coils.

The guidance and return elements are installed sliding on guide rails which are attached longitudinally in the frame.

The guidance and return elements include raceways which can contain balls, ensuring translational motion guidance by rolling.

Each coil in the network of coils comprises a track etched in a printed circuit.

Each coil in the network of coils comprises a wound conductor strip.

Each coil in the network of coils comprises a stack of flat turns.

In the remainder of the description the positioning of the different elements of the actuator according to the invention will be defined in an orthogonal coordinate system XYZ, in which axis X defines the longitudinal direction of the actuator, axis Y defines its transverse direction and axis Z defines its vertical direction. Planes PA of the network of magnets and PB of the network of coils are parallel planes, defined in plane XY of coordinate system XYZ.

BRIEF DESCRIPTION OF THE FIGURES

Other advantages and characteristics of the invention will appear on reading the description, illustrated by the figures, in which:

FIGS. 1A and 1B, previously described, represent a perspective view and an exploded view of a linear motor according to the prior art;

FIGS. 2A and 2B, previously described, represent a perspective view of a Halbach array, together with the field lines generated by this array;

FIGS. 3A and 3B represent two implementations of a vibrotactile actuator according to the invention;

FIGS. 4 to 9 represent various implementations of a vibrotactile actuator according to the invention;

FIGS. 12A-12B represent yet more implementations in which the network of magnets causes a moving surface to move.

DETAILED DESCRIPTION OF AT LEAST ONE EMBODIMENT

Figure 9:
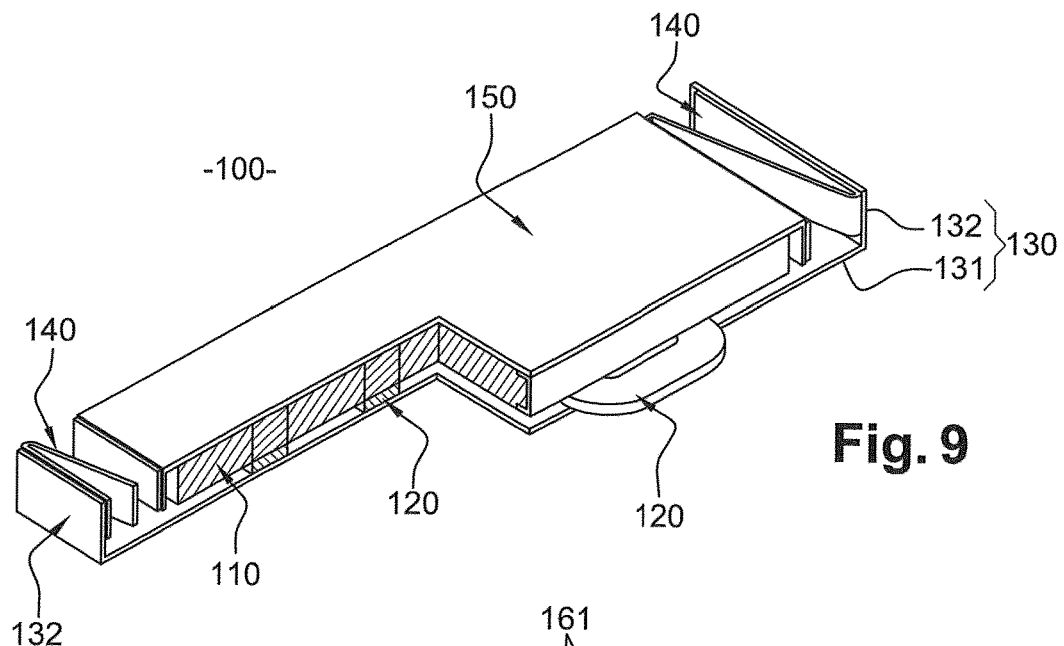

One example implementation of a vibrotactile actuator comprising a linear motor with Halbach array, in which the translation motions caused by the linear motor are transformed into haptic vibrations, is described in detail in what follows, with reference to the appended illustrations. This example illustrates the characteristics and advantages of the invention. It should however be noted that the invention is not limited to this example.

In the figures, identical elements are identified by identical references. To improve legibility of the figures the relative size scales between represented elements are not observed.

FIG. 3A represents a vibrotactile actuator according to certain implementations of the invention. This vibrotactile actuator 100 comprises a network of coils 120 and a network of magnets 110, together forming a linear motor.

Network of coils 120 comprises a plurality of electromagnetic coils juxtaposed longitudinally with one another. In the example of FIG. 3A the network of coils comprises four coils, referenced 121, 122, 123, 124. The person skilled in the art will understand that the number of coils can vary, depending, for example, on the dimensions of the linear motor or the dimensions of the coils, without however modifying the configuration of the actuator as described in what follows. Coils 121-124, which are electrically powered by a power source which is not visible in the figures, are connected to one another to form a linear network of coils. They are arranged such that the current flows, in the adjacent segments of two juxtaposed coils, in common directions which alternate from one pair to the next. In other words, the coils are arranged such that the current flows in the same direction in the first segment, for example 121*a*, of a first coil 121 and in the second segment 122*a* of a second coil 122 when the first segment of the first coil is contiguous to the second segment of the second coil. Thus, in the example of FIG. 3A, the current in segment 121*a* of coil 121 and the current in segment 122*a* of coil 122 flow in an identical first direction, whereas the current in segment 122*b* of coil 122 and the current in segment 123*b* of coil 123 flow in a second identical direction, where this second direction is opposite to the first direction. In a similar manner, the current in segment 122*a* of coil 122 and the current in segment 124*a* of coil 124 flow in the same direction, for example the first direction.

According to one variant, represented in FIG. 3B, network of coils 120 comprises a plurality of electromagnetic coils which are not contiguous to one another. In this variant, network of coils 120 comprises coils positioned in the same plane but separated from one another by a predefined distance. In the example of FIG. 3B, network of coils 120 comprises two coils, referenced 121' and 123', separated by a distance of the order of the width of a magnet in network of magnets 110. In other words, in this variant, the coils are not contiguous with one another, and are traversed by a current the direction of which is identical from one coil to the next. As with the variant of FIG. 3A, the number of coils can vary, depending, for example, on the dimensions of the linear motor or the dimensions of the coils, without however modifying the configuration of the described actuator. The coils, which are electrically powered by a power source which is not visible in the figures, are connected to one another to form a linear network of coils 120. They are arranged such that the current flows in identical directions in each coil. In other words, the coils are arranged such that the current flows in the opposite direction in the first segment, for example 121'*a*, of a first coil 121' and in the second segment 122'*a* of a second coil 122' when the first segment of the first coil is next to the second segment of the second coil.

Regardless of the variant in question (contiguous coils or non-contiguous coils), coils 121-124 or 121-124' are flat coils, for example, coils of rectangular shape, positioned in the same first plane PB. Coils 121-124 can be installed and attached on a flat bracket 125 so as to ensure that network of coils 120 is flat. This bracket 125 can be a plate made from an insulating material with a structural function, such as ABS (Acrylonitrile Butadiene Styrene) or any other injectable plastic.

For the sake of simplifying the description, several implementations, variants and examples will be described, in what follows, for a network of coils in which the coils are contiguous with one another, with the understanding that they could also be described for a network of coils the coils of which are separate—i.e. non-contiguous—from one another.

Network of magnets 110 is a Halbach array, as represented in FIG. 4, comprising a plurality of flat permanent magnets the polarities of which are aligned in more than two different directions. For example, the polarity of a first magnet 118 can be aligned in direction X, while that of a second magnet 117 (contiguous to the first magnet) is aligned in a direction forming an angle of 90° with direction X and direction Y, and while a third magnet 116 (contiguous to the second magnet) is aligned in direction −X and while a fourth magnet 115 (contiguous to the third magnet) is aligned in a direction forming an angle of 90° with direction −X and direction −Y. Such a Halbach array enables the magnetic field generated by the network of magnets to be aligned with the same face of the said network. In the example of FIG. 4, Halbach array 110 comprises nine permanent magnets 111-119, called in what follows simply "magnets", which have four directions of different polarities. The person skilled in the art will understand that the number of magnets and the number of directions of the polarities can vary, without however modifying the configuration of the actuator as described below, since the polarities of the magnets can, for example, be aligned in directions Y or −Y, and in many different directions of plane XY. Magnets 111-119 are arranged longitudinally in succession, and assembled with one another, for example by bonding, embedding or fretting. These magnets 111-119 are positioned such that two consecutive magnets have polarities of different alignments. In the example de FIG. 4, the polarity of magnet 111 is aligned in a direction −90° relative to axis X, the polarity of magnet 112 is aligned in the direction opposite axis X, the polarity of magnet 113 is aligned in a direction 90° relative to axis X, and the polarity of magnet 114 is aligned in the direction of axis X, with the same diagram of alignment of polarities reproduced for magnets 115 to 119.

The magnets of network of magnets 110 are arranged in linear fashion in plane PA, parallel to plane PB of network of coils 120, as represented in FIG. 3A. Planes PA of the network of magnets and PB of the network of coils are parallel planes, defined according to axes X and Y of coordinate system XYZ. Plane PA of network of magnets 110 is separated, in axis Z, from plan PB of network of coils 120, such that an air gap e (in axis Z) is created between the network of coils and the network of magnets. This air gap e is small compared to the longitudinal and transverse dimensions of the networks of magnets and coils. With this configuration, network of coils 120 is positioned directly above network of magnets 110, with coils 121-124 opposite magnets 111-119.

According to certain implementations, network of coils 120 is positioned above network of magnets 110, as represented in FIG. 3A. In other words, in direction Z, vibrotactile actuator 100 comprises in ordered fashion frame 130, network of magnets 110 and network of coils 120. Network of coils 120 is then directly above network of magnets 110.

In other implementations, such as the one represented in FIG. 4, network of magnets 110 is positioned above network of coils 120. In other words, in these implementations, in direction Z, vibrotactile actuator 100 comprises in ordered fashion frame 130, network of coils 120 and network of magnets 110. Network of magnets 110, which are permanent, is then directly above network of coils 120.

Regardless of the relative arrangement of network of coils 120 and of network of magnets 110, the said network of magnets causes magnetic field lines directed towards network of coils 120. When an oscillating current flows in network of coils 120, an oscillating Laplace force is generated in axis X. The electromagnetic interaction between the current lines traversing network of coils 120 and the magnetic flux generated by network of magnets 110 transforms the electrical energy into a linear mechanical energy, causing relative translation motions between the said network of magnets and the said network of coils.

The vibrotactile actuator according to the invention comprises elastic guidance means, referenced 140 in FIGS. 3 and 4, designed to ensure the longitudinal movement of parts 110 and 120 relative to one another, such that if one of them is connected to an external object, any movement of the free part will result in a movement of the external object, due to the principle of conservation of angular momentum, transforming the electrical energy into haptic vibrations. These elastic guidance means 140 form an elastic suspension which guides one of the networks relative to the other in a roughly rectilinear trajectory. These elastic guidance means 140 can take the form, for example, of one or more guidance and return elements, called more simply return elements, or alternatively a guide rail system—as described below—the goal of which is to transform the electrical energy by interaction of networks of coils 120 and of magnets 110 into haptic vibrations using the Laplace force to this end. Indeed, elastic guidance means 140, due to their elastic characteristic, provide a wide vibration amplitude.

According to certain implementations, the vibrotactile actuator comprises a frame 130 in which are housed at least partly network of coils 120 and network of magnets 110. This frame 130 can comprise a longitudinal bed 131 equipped, at at least one of its ends, with a support arm 132. In the example of FIGS. 3 and 4, bed 131 of frame 130 comprises a support arm 132 at each of its longitudinal ends. In these implementations, elastic guidance means 140 can be installed in frame 130 and securely attached to support arms 132 and either of networks of coils 120 or of magnets 110.

In the implementations of FIG. 3A, network of magnets 110 is securely attached to bed 131 of frame 130 and network of coils 120 is suspended above network of magnets 110, via guidance means 140. An air gap e, which is narrow relative to the other dimensions of the vibrotactile actuator, is then created between network of magnets 110 and network of coils 120. This air gap e can, for example, measure several tens of micrometres. Under the effect of the electromagnetic interaction between network of coils 120 and network of magnets 110, network of coils 120 is free to move with translational motion in direction X (in the direction +X and the direction −X) relative to network of magnets 110.

In certain implementations, elastic guidance means 140 can comprise return elements 140 installed between network of coils 120 and support arms 132, as represented in FIG. 3A, or between network of magnets 110 and support arms 132, as represented in FIG. 4. In these examples, one of the networks (coils or magnets) is attached to bed 131 of frame 130, while the other network is suspended between return elements 140. These implementations optimise the generation of haptic vibrations, by allowing the relative movement of one of the networks, whilst preventing return elements 140 from rubbing on the bed of the frame.

Return elements 140 can be, for example, thin blades 141, 142, each positioned between network of coils 120 or network of magnets 110 and a support arm 132 of frame 130. Each thin blade 141 can have, in plane PA or plane PB, an S shape, with a first apex 141a attached to support arm 132 and a second apex 141b attached to the longitudinal end of the network of coils or magnets. Examples of thin S-shaped blades 141 are represented in FIGS. 3 and 4. Such thin S-shaped blades have great stiffness in torsion.

According to other examples, represented in FIGS. 5 and 6, return elements 140 can be thin blades 142 having, in plane PA or plane PB, an X shape, with two legs of the X 142a attached to support arm 132 and the other two legs of the X 142b attached to a longitudinal end of network of coils or magnets. These implementations have the advantage that they result in a guidance which it is appreciably more accurate than the one produced by thin S-shaped blades 141.

Whether they are X- or S-shaped, thin blades 141, 142 are made from a material which is sufficiently rigid to remain longitudinally between support arms 132 and the networks of coils or magnets, and sufficiently elastic to transform the linear mechanical energy into vibrations of variable amplitudes. Thin blades 141, 142 can be made from elastomers such as polysiloxanes, rubbers or metal strips with a high elastic limit, such as certain copper alloys or steels, enabling haptic vibrations to be generated from the linear mechanical energy derived from the networks of coils and magnets. Thin blades can, in particular, be made from a copper alloy with beryllium, since this material has the advantage that it is sufficiently flexible and elastic to offer a wide bandwidth of the order of 10 Hz to several kHz. According to certain implementations, the apices of thin S-shaped blades 141 or the legs of thin X-shaped blades 142 are attached to support arms 132 and/or the longitudinal ends of the network of coils or the network of magnets, for example by bonding. According to other implementations, the apices of thin S-shaped blades 141 or the legs of thin X-shaped blades 142 are moulded, for example by injection, with support arms 132 and/or support ends 125 of the network of coils.

In certain implementations, for example those of FIGS. 3 and 5, thin blades 141 or 142 are manufactured from an electrically conductive material. The thin blades thus form not only the return elements of actuator 100, but also the electrical connections which connect the coils electrically to an electrical power source.

In certain implementations, for example those of FIGS. 4 and 6, network of magnets 110 has the advantage that it forms a thermal bridge, which facilitates the dissipation of the heat produced by the Joule effect, in coils 121-124, when the electrical current is applied.

According to other implementations, return elements 140 are slides 143a, 143b installed sliding on guide rails 143c, and forming, with the said guide rails, a guide rail system 143. Examples of such implementations are represented in FIGS. 7 and 8. This guide rail system 143 comprises, for example, two parallel guide rails 143c, positioned longitudinally either side of network of coils 120 (example of FIG. 7) or of network of magnets 110 (example of FIG. 8). These guide rails 143c are attached, at each longitudinal end, in support arms 132 of frame 130. Slides 143a, 143b of guide rail system 143 are designed to slide on guide rails 143c. Slides 143a, 143b are moving transverse elements which are securely attached to network of coils 120 (example of FIG. 7) or to network of magnets 110 (example of FIG. 8). Each of these slides 143a, 143b can be attached to a longitudinal end of the network of coils or magnets, for example by bonding, or can be formed as a single part, for example by moulding, with support 125 of network of coils 120. According to another implementation related to the guide rail system, the guidance can be provided by a rolling system in which balls made of metal, plastic or elastomer are constrained by raceways of a type well known to the person skilled in the art.

In the implementations of FIGS. 7 and 8, slides 143a, 143b can be associated with compression springs, for example two such, designed to recentre the slides towards an idle position.

In the implementations of FIGS. 7 and 8, slides 143a, 143b, made from a pair of materials with low friction coefficient, such as steel against sintered bronze or steel against self-lubricating plastics, enable the motion of the moving portions arising from the interaction of the networks of coils and magnets to be guided with precision as haptic vibrations.

In certain implementations network of coils 120 and network of magnets 110 are at least partially enclosed in a casing 150, as in the example of FIG. 9. This casing 150 is attached to network of coils 120 (unrepresented implementation) or to network of magnets 110 (implementation of FIG. 9), such that it can be moved with a linear movement relative to bed 131 of frame 130. Casing 150 then moves in linear fashion, simultaneously with the network (of coils or magnets) to which it is securely attached. In this implementation, return elements 140 are installed between casing 150 and support arms 132 of frame 130, which allows a simplified installation of return means 140 in actuator 100.

In variants, represented in FIGS. 12A and 12B, network of coils 120 and network of magnets 110 are positioned between frame 130 and a moving surface 152. Moving surface 152, for example a flat surface such as a touchscreen or a skew surface, is attached to network of magnets 110, where network of coils 120, for its part, is attached to frame 130. In these variants, network of coils 120 and network of magnets 110 are positioned opposite one another and separated from one another so as to allow moving surface 152 to move relative to frame 130. Moving surface 152 and frame 130 are connected by elastic guidance means 140, such as, for example, a flexible link, which allow said moving surface 152 to move. The assembly of networks of coils 120 and of magnets 110 thus generates haptic feedback in moving surface 152. In the example of FIG. 12A a single network of coils 120 and a single network of magnets 110 are positioned opposite one another, roughly in the centre of moving surface 152. In the example of FIG. 12B a first assembly of networks of coils 120 and of magnets 110 is positioned at one end of moving surface 152, with a second assembly of networks of coils 120' and of magnets 110' positioned at another end of the said moving surface. The person skilled in the art will understand that the number of assemblies of networks of coils and of magnets, and their positioning, can depend on various criteria such as, for example, dimensions and/or the mass of the moving surface, the dimensions of the networks of coils and of magnets, the applications sought, etc.

Regardless of the implementation, the moving mass is optimised in the vibrotactile actuator of the invention, which enables the said actuator to have a small Z axis dimension compared to the dimensions in axes X and Y. The vibrotactile actuator of the invention can be less than 4 mm thick, giving it a format the ratio of dimensions of which is similar to that of a wafer.

Figure 10A:
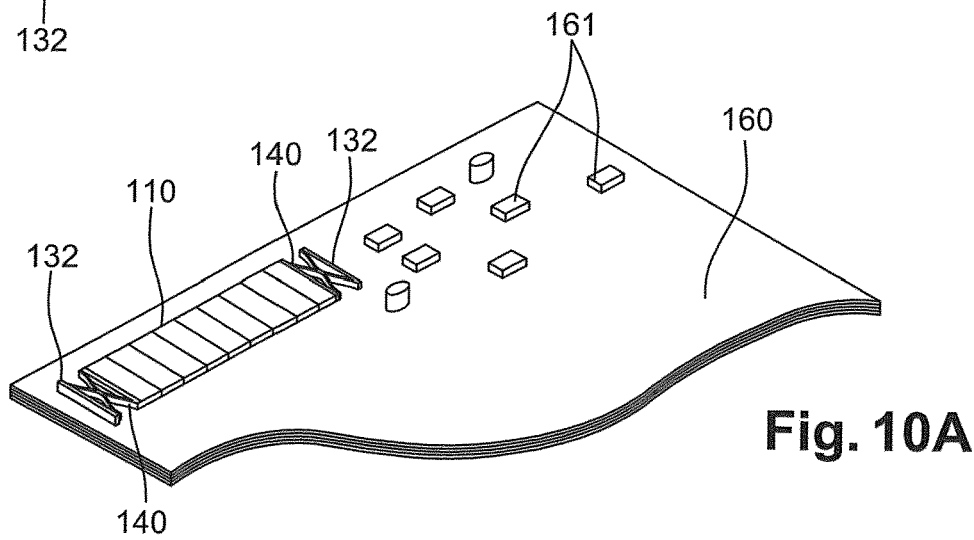
FIGS. 10A, 10B and 10C represent various implementations of the coils of the network of coils of the vibrotactile actuator according to the invention.

According to certain implementations, coils 121-124 of network of coils 120 can be made by means of conductive tracks etched in a multi-layer printed circuit. An example of an actuator comprising such a network of coils is represented in FIG. 10A. In these implementations, the network of coils is etched in substrate 160, to the surface of which electronic components 161 used by the device for applications other than haptic vibrations are connected. Substrate 160 constitutes not only the network of coils but also bed 131 of the frame. Support arms 132 are then attached directly to substrate 160 to hold network of magnets 110 above the etched coils. These implementations have the advantage that they reduce further the vibrotactile actuators encumbrance, since the network of coils is etched in substrate 160. The thickness of the actuator is then roughly equal to that of an electronic component. These implementations also have the advantage that they simplify fabrication of the actuator by using known methods to fabricate the network of coils, and to eliminate the connections required for the electrical power of the network of coils, which reduces the actuators fabrication costs whilst increasing its reliability.

In certain implementations each coil 121-124 of the network of coils comprises an electric wire of round section, wound, for example, around a mandrel of rectangular section, so as to form a rectangular flat coil.

Figure 10B:
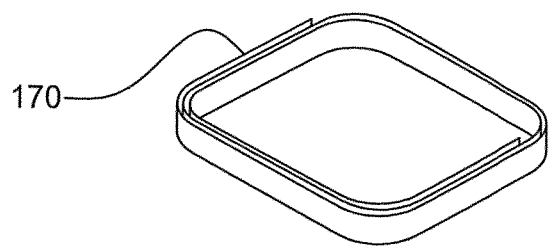

In other implementations each coil 121-124 of the network of coils comprises a coiled conductive strip 170. This conductive strip 170, made for example of copper or sufficiently pure aluminium, is wound along its length, with a rectangular shape, so as to form a rectangular coil such as the one represented in FIG. 10B. This coil is a flat coil the thickness of which is equal to the width of the conductive strip.

Figure 10C:
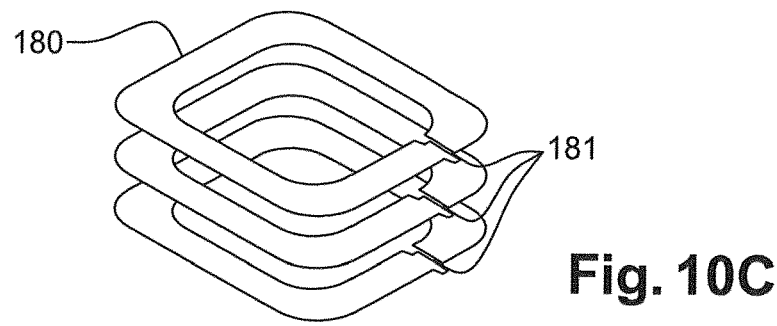

In other implementations each coil 121-124 of the network of coils comprises a stack of turns as represented in FIG. 10C. Turns 180, the number of which depends on the thickness and/or the power desired for the coil, are made of sheets of conductive material, cut in the form of rectangular rings, and stacked on top of one another. Each turn 180 is connected to the next one, or the previous one, for example by soldering points 181 so as to form a flat coil with multiple turns. Such coils with stack of turns have the advantage that they can be fabricated directly in a medium, enabling particularly fine actuators to be produced.

Figure 11A:
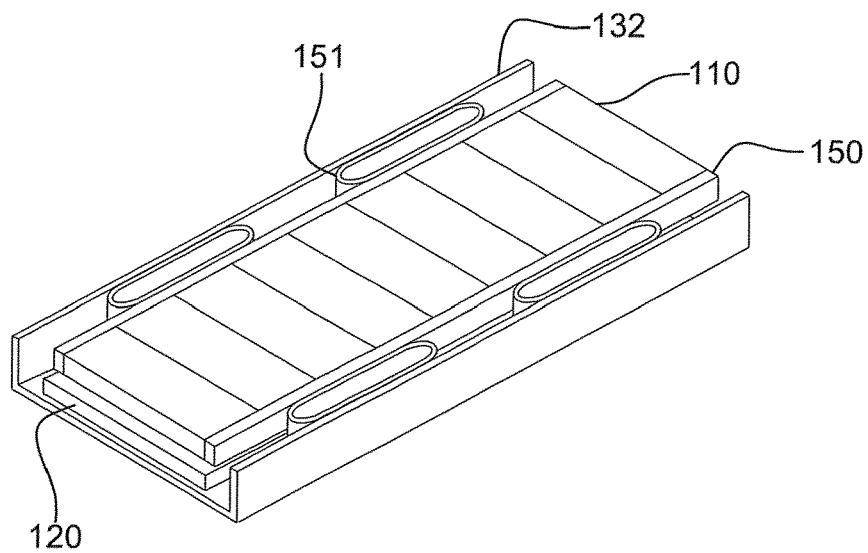
FIGS. 11A, 11B, 11C and 11D represent various implementations enabling the performance of the device in the normal direction to be improved.
Figure 11B:
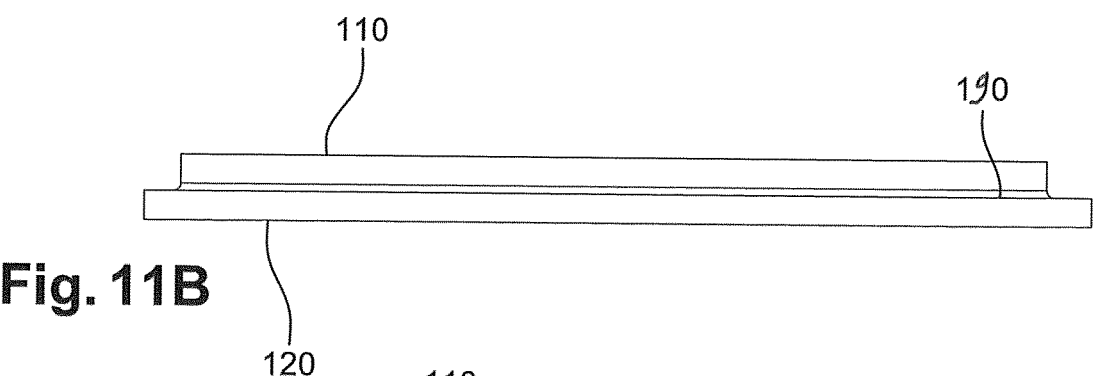

In certain implementations it can be of interest to optimise the performance of the vibrotactile actuator by reducing the distance between network of magnets 110 and network of coils 120 to a very low value. Indeed, as shown in FIG. 2B, the field lines of a Halbach array, although generally orthogonal to the main plane of the network in the regions of symmetry, tend to diverge in the adjacent regions. Therefore, when the actuator is used in low frequencies, and therefore when the movements are large, the Laplace force is not perfectly tangential to the main plane of the actuator (plane of the network of magnets and/or of coils), which can cause an untimely movement of the parts which move with relative motion in normal direction Y. To prevent such an untimely movement the guidance and return elements can be loop-shaped thin blades 151 positioned laterally between frame 132 and network of magnets 110 or network of coils 120, as represented in FIG. 11A. These thin blades 151 can be formed from thin metal strips, or made from elastomers, such as those mentioned above, which have the advantage that they have great rigidity in the Y direction, normal to planes PA, PB of the networks de magnets and of coils, and great flexibility in tangential direction Z. These loops 151 are connected to the moving part, for example to network of magnets 110, firstly, and to frame 132, secondly. These implementations have the dual advantage that they make the actuator not only thinner, but also more effective, since it makes use of a more intense magnetic field.

In certain applications, in particular high-performance applications, it can be advantageous to constrain substantially the reciprocal motions of the moving parts—in particular the network of magnets or the network of coils—in normal direction Y. Such a constraint can be obtained by impedance means, such as a fluid 190 introduced into an available interstitial space between network of magnets 110 and network of coils 120, i.e. between the reciprocally moving parts the desired value for the thickness of which is preferentially less than ten microns, as represented in FIG.

Figure 11C:
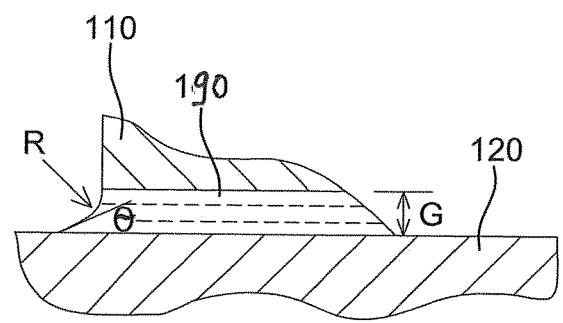

11B. Such a fluid 190 is maintained in place permanently due to the capillary force resulting from the use of an appropriate fluid, such as glycerine, ethylene glycol or refined mineral oil, which are non-toxic, and have appropriate viscosities. The presence of a meniscus of average radius R, at the junction between network of magnets 110 and network of coils 120, an example of which is illustrated by FIG. 11C, is associated with a capillary force due to the pressure resulting from the surface tension of fluid 190. This pressure P can be estimated by the formula $P=\gamma(2\cos\theta/G)$, where $\gamma$ is the surface tension, $\theta$ the liquid-solid contact angle, and G the thickness of the interstitial space. A rapid calculation with the preceding formula shows that, for the materials cited above, this force will be of the order of 1 milli-Newton for opposite surfaces of one square centimetre, and therefore that it may be necessary to take it into consideration in the dimensioning of the guidance system. The presence of a liquid of low viscosity between the two reciprocally moving parts does not prevent them moving in tangential direction Z, but constrains all rapid oscillations in normal direction Y. This variant enables vibrotactile actuators to be produced having an interstitial space G which is very small, which enables a thin and effective actuator to be produced.

Figure 11D:
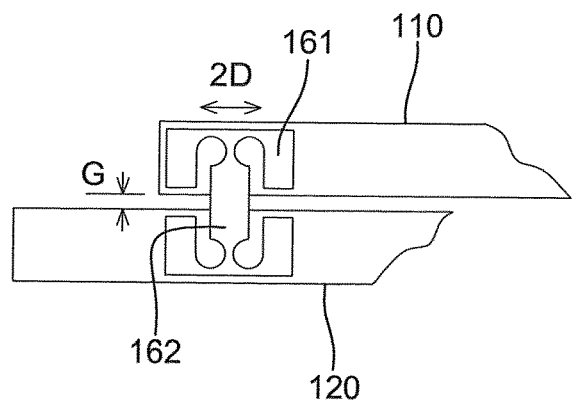

Another implementation of guidance in direction Y normal to plane PA and PB of the actuator can also consist of at least one pair of flanges 161 added to the ends of networks of magnets 110 and of coils 120 with reciprocal motion. These flanges 161 can be formed from parts comprising two thin sections, as illustrated by FIG. 11D. A rapid calculation shows that if the movement of an amplitude 2D of networks of magnets 110 and of coils 120 causes an inclination of more or less thirty degrees of link 162, the variation of interstitial distance G will not exceed 14%.

The vibrotactile actuator according to the invention can be inserted in or attached to any type of device in order to communicate haptic vibrations to the said device. Indeed, if bed 131 of frame 130 is attached to a structure to which the vibrations must be communicated, by application of the principle of conservation of angular momentum, at frequencies higher than the natural resonance frequency of the assembly consisting of the moving mass and of the suspension formed by the network of magnets or the network of coils, the ratio of speeds of the coils and of the mass of the structure which must be made to vibrate are in inverse proportion to their reciprocal masses. Due to its small dimensions such an actuator can be attached, for example, to a bracelet of the wristwatch type, to communicate, by vibrations, the time to its user. It can also be attached, for example, in the sole of a shoe, to an item of clothing or in any element in contact with the user.

Although described through a number of examples, variants and implementations, the vibrotactile actuator according to the invention comprises various variants, modifications and improvements which will appear in an obvious manner to the person skilled in the art, with the understanding that these variants, modifications and improvements are within the scope of the invention.

The invention claimed is:

1. A vibrotactile actuator, comprising:
a network of flat electromagnetic coils positioned contiguously in a plane and arranged such that an electrical current flows, in segments adjacent to two juxtaposed coils, in common directions which alternate from pair to pair, where said network of flat electromagnetic coils is able to generate a Laplace force under the effect of the electrical current traversing said network of flat electromagnetic coils,
a network of permanent contiguous magnets assembled in linear fashion in a plane parallel to the plane of the network of flat electromagnetic coils, the polarities of which are aligned in more than two different directions, wherein said network of permanent magnets forms a Halbach array generating magnetic field lines aligned towards the network of flat electromagnetic coils, wherein an electromagnetic interaction between current lines traversing the network of flat electromagnetic coils and the magnetic field lines causes, due to the Laplace force, relative translational motions between the network of flat electromagnetic coils and the network of permanent magnets, and
elastic guidance means to generate haptic vibrations from relative translational motions between the network of flat electromagnetic coils and the network of permanent magnets.

2. The vibrotactile actuator according to claim 1, further comprising a frame in which the network of flat electromagnetic coils and the network of permanent magnets are installed.

3. The vibrotactile actuator according to claim 2, wherein the elastic guidance means are installed at least partially between the frame and either the network of flat electromagnetic coils or the network of permanent magnets.

4. The vibrotactile actuator according to claim 1, wherein the elastic guidance means are installed longitudinally in the plane of the network of flat electromagnetic coils.

5. The vibrotactile actuator according to claim 1, wherein the elastic guidance means are installed longitudinally in the plane of the network of permanent magnets.

6. The vibrotactile actuator according to claim 5, wherein each guidance and return element comprises an S-shaped thin blade.

7. The vibrotactile actuator according to claim 5, wherein each guidance and return element comprises an X-shaped thin blade.

8. The vibrotactile actuator according to claim 5, wherein the guidance and return elements are installed sliding on guide rails or ball bearing raceways, attached longitudinally in the frame.

9. The vibrotactile actuator according to claim 1, wherein the elastic guidance means comprise at least two guidance and return elements, each installed at one end of the network of flat electromagnetic coils or of the network of permanent magnets.

10. The vibrotactile actuator according to claim 9, wherein the guidance and return elements comprise impedance means able to constrain the relative linear motions in the direction normal to the network of permanent magnets and to the network of flat electromagnetic coils.

11. The vibrotactile actuator according to claim 1, wherein the elastic guidance means are installed laterally along the network of permanent magnets or the network of flat electromagnetic coils.

12. The vibrotactile actuator according to claim 11, wherein the elastic guidance means comprise guidance and return elements, each comprising thin blades with the shape of oblong loops, installed either side of the network of flat electromagnetic coils or of the network of permanent magnets.

13. The vibrotactile actuator according to claim 1, wherein each coil of the network of flat electromagnetic coils comprises a stack of flat turns.

14. The vibrotactile actuator according to claim 1, wherein the network of flat electromagnetic coils is attached to the frame and the network of permanent magnets is attached to a moving surface, wherein said moving surface is connected to the frame by flexible connections.

15. A vibrotactile actuator, comprising:
- a network of flat electromagnetic coils positioned non-contiguously in a plane and arranged such that an electrical current flows in identical directions in each coil, wherein said network of flat electromagnetic coils is able to generate a Laplace force under the effect of the electrical current traversing said network of flat electromagnetic coils,
- a network of permanent contiguous magnets assembled in linear fashion in a plane parallel to the plane of the network of flat electromagnetic coils, the polarities of which are aligned in more than two different directions, wherein said network of permanent magnets forms a Halbach array generating magnetic field lines aligned towards the network of flat electromagnetic coils, wherein an electromagnetic interaction between current lines traversing the network of flat electromagnetic coils and the magnetic field lines causes, due to the Laplace force, relative translational motions between the network of flat electromagnetic coils and the network of permanent magnets, and
- elastic guidance means to generate haptic vibrations from relative translational motions between the network of flat electromagnetic coils and the network of permanent magnets.

16. The vibrotactile actuator according to claim 15, further comprising a frame in which the network of flat electromagnetic coils and the network of permanent magnets are installed.

17. The vibrotactile actuator according to claim 16, wherein the elastic guidance means are installed at least partially between the frame and either the network of flat electromagnetic coils or the network of permanent magnets.

18. The vibrotactile actuator according to claim 15, wherein the elastic guidance means are installed longitudinally in the plane of the network of flat electromagnetic coils.

19. The vibrotactile actuator according to claim 15, wherein the elastic guidance means are installed longitudinally in the plane of the network of permanent magnets.

20. The vibrotactile actuator according to claim 19, wherein each guidance and return element comprises an S-shaped thin blade.

21. The vibrotactile actuator according to claim 19, wherein each guidance and return element comprises an X-shaped thin blade.

22. The vibrotactile actuator according to claim 19, wherein the guidance and return elements are installed sliding on guide rails or ball bearing raceways, attached longitudinally in the frame.

23. The vibrotactile actuator according to claim 15, wherein the elastic guidance means comprise at least two guidance and return elements, each installed at one end of the network of flat electromagnetic coils or of the network of permanent magnets.

24. The vibrotactile actuator according to claim 23, wherein the guidance and return elements comprise impedance means able to constrain the relative linear motions in the direction normal to the network of permanent magnets and to the network of flat electromagnetic coils.

25. The vibrotactile actuator according to claim 15, wherein the elastic guidance means are installed laterally along the network of permanent magnets or the network of flat electromagnetic coils.

26. The vibrotactile actuator according to claim 25, wherein the elastic guidance means comprise guidance and return elements, each comprising thin blades with the shape of oblong loops, installed either side of the network of flat electromagnetic coils or of the network of permanent magnets.

27. The vibrotactile actuator according to claim 15, wherein each coil of the network of flat electromagnetic coils comprises a stack of flat turns.

* * * * *